United States Patent [19]

Barbella et al.

[11] Patent Number: 4,599,616
[45] Date of Patent: Jul. 8, 1986

[54] RADAR FUZE SYSTEM

[75] Inventors: Peter F. Barbella, Littleton; Ronald A. Wagner, Hudson, both of Mass.

[73] Assignee: The United States of America as represented by the Secretary of the Air Force, Washington, D.C.

[21] Appl. No.: 512,435

[22] Filed: Jul. 5, 1983

[51] Int. Cl.$^4$ .................................... F42C 13/04
[52] U.S. Cl. ................................... 343/7 PF
[58] Field of Search ..................... 343/7 PF

[56] References Cited

U.S. PATENT DOCUMENTS

| | | | |
|---|---|---|---|
| 3,924,234 | 12/1975 | Cash et al. | 343/7 PF |
| 4,096,480 | 6/1978 | Miner et al. | 343/100 LE |
| 4,158,842 | 6/1979 | Clemens et al. | 343/7 PF |
| 4,196,433 | 4/1980 | Brown | 343/6 R |
| 4,205,316 | 5/1980 | Peperone | 343/14 |
| 4,214,240 | 7/1980 | Weiss | 343/7 PF |
| 4,220,952 | 9/1980 | Whiteley et al. | 343/7 PF |
| 4,232,314 | 11/1980 | Adrian | 343/7 PF |
| 4,236,157 | 11/1980 | Goss et al. | 343/7 PF |
| 4,297,702 | 10/1981 | Carnes | 343/7 PF |

Primary Examiner—T. H. Tubbesing
Attorney, Agent, or Firm—Donald J. Singer; Richard J. Donahue

[57] ABSTRACT

A radar fuzing system for use in a guided missile wherein the system is tuned in accordance with the estimated intercept closing velocity to permit the use of narrower bandpass filters and thereby reduce the probability of detecting pulse repetition frequency lines and very low Doppler returns from chaff bundles.

6 Claims, 1 Drawing Figure

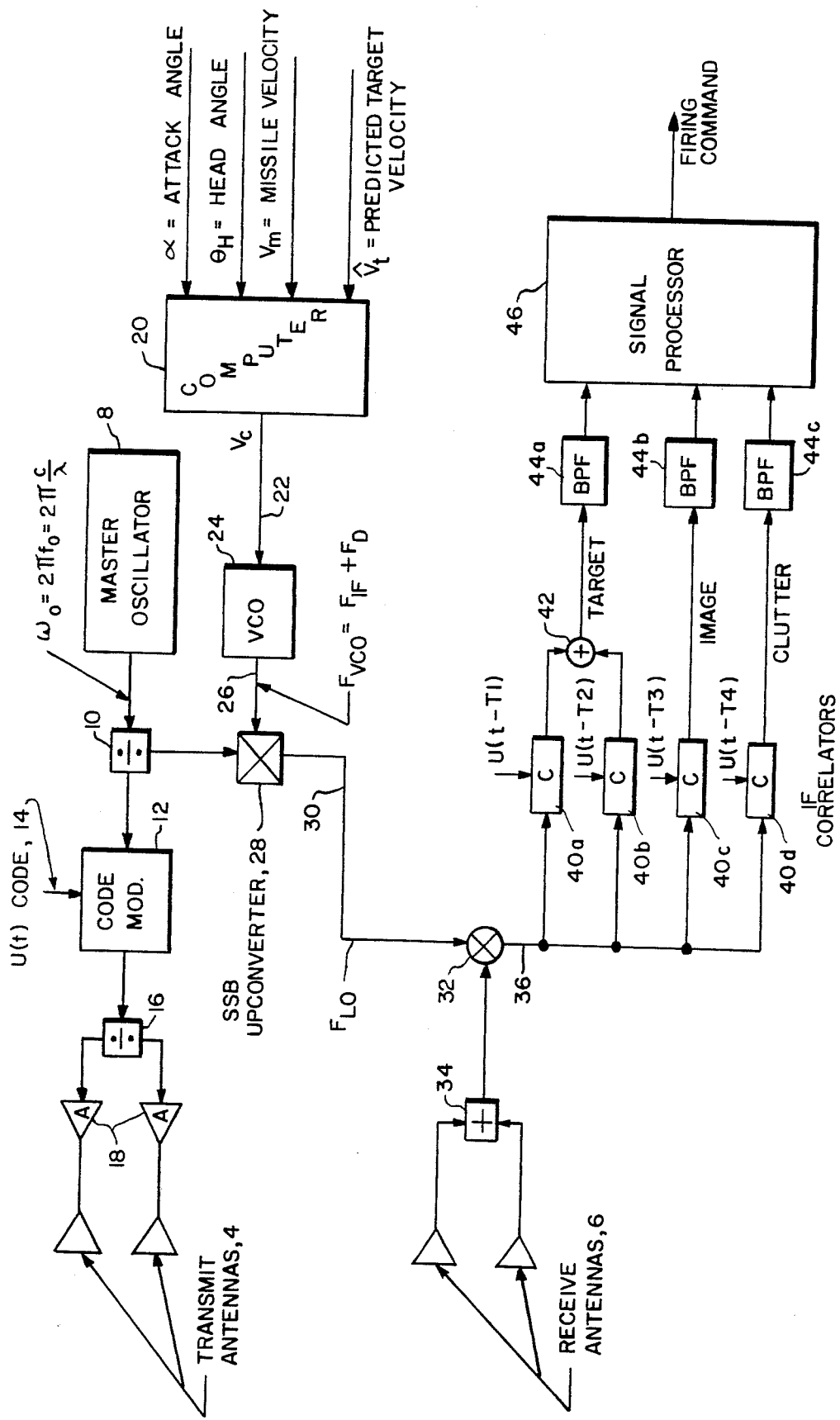

RADAR FUZE SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar fuzing systems and in particular to an improved tuned radar fuzing system.

In U.S. Pat. No. 4,297,702 issued on Oct. 27, 1981 to Irvin S Carnes, and incorporated herein by reference, there is disclosed a radar fuzing system for use on board missiles, where packaging volume and power availability are at a premium. The system is operated in a continuous wave mode in order to maximize energy on target and is arranged to utilize a polyphase coding technique to obtain target range information. Within the receiver the requisite correlation function is performed at the radar frequency utilizing twin dual gate FET (field effect transistor) devices and the correlated return signals are directly down-converted to baseband video signals. The resulting signals are then Doppler filtered and detected.

In a system of this the polyphase (pseudorandom) code length may, for example be 255 bits where each bit is 22 nanoseconds wide, equating to a PRF (pulse repetition frequency) of 178 kHz. Consequently, while it is desired that the Doppler filter be as wide as possible in order to handle both slow and fast moving target situations, e.g. helicopters and high speed aircraft, it is equally imperative that the Doppler filter provide maximum attenuation (60 dB) at 178 kHz in order to reject the PRF line which would otherwise appear for non-correlated targets. That is to say, when the target returns are out of range of the fuze system, maximum attenuation must be provided at 178 kHz to prevent the system from fuzing (detecting a target) on one of the PRF lines.

The Doppler filter currently implemented in such systems is an eight pole Chebyshev device which provides the desired rejection at 178 kHz and has a cut-off frequency of approximately 98 kHz. Recent analysis, however, has shown that the maximum expected Doppler frequency from high speed targets could be as high as 150 kHz. In consequence, then, the present filter design is clearly inadequate and the design of a new filter having a cut-off frequency beyond 150 kHz, yet providing maximum attenuation at 178 kHz, would be very arduous, if not impossible.

There is a secondary problem associated with the use of a broadband Doppler filter in a fuze system. This problem involves the response of the system to partially blossomed chaff bundles. Thus, if the missile is in a tail chase engagement, the missile may well be armed (if arming is conditional solely on the boresight error data rising above some threshold) and then any detection within the Doppler filter bandwidth will cause detonation of the warhead. Obviously, when the chaff bundles are ejected by the target aircraft they will have the same Doppler frequency as the target aircraft. The Doppler frequency of the chaff bundles will, however, decay almost exponentially. If the missile were to fuze on a chaff bundle having a low Doppler frequency, the target may in this instance be well beyond the lethal zone of the warhead.

SUMMARY OF THE INVENTION

It is therefore an object of this invention to provide an improved pseudorandom coded tuned fuzing system capable of utilizing relatively narrow band Doppler filter devices.

It is a further object of the present invention to provide a pseudorandom coded tuned fuzing system capable of rejecting signals formed by partially blossomed chaff bundles.

These and other objects of the invention are attained generally by providing a tuned fuzing system utilizing a narrow band Doppler filter arrangement. Briefly, the present system utilizes the missile's knowledge of its attitude and velocity to compute an estimate of the intercept closing velocity. This computation has the effect of greatly reducing the required worst case Doppler bandwidth to about two thirds of its present value. The estimate of closing velocity is applied as a control voltage to a VCO (voltage controlled oscillator), the output signal from which is the sum of the estimated intercept closing Doppler frequency and a selected intermediate frequency. The output signal from the VCO is then mixed with a signal from the master oscillator to produce the system local oscillator signal. After down-conversion, the received signals are correlation processed and applied to the narrower Doppler filters, the latter having a bandwidth of approximately 66 KHz and centered at the IF (intermediate frequency). Controlling the VCO has the effect of tuning the system, i.e., keeping the return signal centered in the narrow band Doppler filters, thereby providing a greatly reduced probability of detecting the 178 Khz pulse repetition frequency lines and the very low Doppler returns from chaff bundles.

BRIEF DESCRIPTION OF THE DRAWINGS

The foregoing and other features of the invention, as well as the invention itself, may be more fully understood from the following detailed description when read together with the accompanying drawing, in which:

The sole FIGURE of the drawing is a simplified block diagram of a radar fuzing system incorporating the teachings of the present invention.

DESCRIPTION OF THE PREFERRED EMBODIMENT

Referring now to the drawing, the tuned fuzing system includes a pair of transmitting antennas 4 generally mounted at diametrically opposed points on the body of a missile. Signals are returned to the fuzing system via a pair of receiving antennas 6 disposed in the spaces on the missile between the transmitting antennas 4. A continuous wave R.F. signal generated by master oscillator 8 is coupled via signal divider 10 to a code modulator 12. A binary pseudorandom code U(t) having a unique configuration adapted to provide a peak response when compared to an in-phase replica of itself, and to provide a low amplitude response under other circumstances, is applied to control lead 14 of code modulator 12. The resultant output signal therefrom is coupled via power divider unit 16 to signal amplifiers 18 and thence to the aforementioned transmitting antennas 4. Thus, a pseudorandom code modulated R.F. signal is emitted by the system.

In the present invention, a system tuning control voltage $V_c$ is generated by computer 20 related to the estimated intercept closing velocity in accordance with the equation:

$$V_c = 1/K \, [2/\lambda (V_m \cos(\theta + \alpha) + V_t \cos(\theta + \alpha + \epsilon))]$$

where:
$\theta$ = fuze antenna cone angle
$\alpha$ = missile attack angle
$V_m$ = velocity of the missile
$V_t$ = predicted velocity of the target
$\epsilon = \theta_H + \sin^{-1}[V_m/V_t \sin\theta_H 9$
where:
$\theta_H$ = angle between the axis of the missile and its seeker antenna centerline.

Computer 20 may be a pre-existing device contained within the missile and need not generally be separately supplied in the present invention. Control signal $V_c$ is coupled via lead 22 to the control input of a VCO (voltage controlled oscillator) 24. Output signals on the output lead 26 of the voltage controlled oscillator 24 have a frequency $F_{vco}$ defined by the equation:

$$F_{vco} = F_{IF} + F_D$$

where:
$F_{IF}$ is the selected intermediate frequency of the system and
$F_D$ is the estimated intercept closing Doppler frequency.

The frequency $F_{vco}$ is then coupled to a single sideband up-converter 28, together with a portion of the signal generated by master oscillator 8. The output signal therefrom, (the local oscillator frequency $F_{LO}$) on lead 30 is then mixed in mixer 32 with incoming target signals, the latter having been received by receive antennas 6 and combined in summing unit 34. Output signals on lead 36 of mixer 32 are then coupled to each of the correlator units 40a, 40b, 40c and 40d which may be conventional ring modulator devices.

Correlator unit 40a also receives the pseudorandom code signal $U_{(t)}$ which has been delayed by the time $T_1$ while correlator 40b receives the coded signal delayed by a time $T_2$. Output signals from correlators 40a and 40b are then combined in summing unit 42 and thereafter applied to bandpass filter 44a. This combined signal constitutes the target detector channel of the fuze system.

In a similar manner, correlator 40c receives as an additional input the pseudorandom code signal $U_{(t)}$ delayed by a time $T_3$ to provide a resultant input signal to bandpass filter 44b. This constitutes the image detector channel of the fuze system. Similarly, correlator 40d receives the coded signal $U_{(t)}$ delayed by a time $T_4$, and its resultant output signal is applied to bandpass filter 44c. This constitutes the clutter detector channel of the fuze system.

Output signals from the bandpass filters 44a, 44b and 44c are applied to a signal processor 46 wherein they are further processed by known techniques to provide a firing command to the missile warhead.

As previously mentioned the bandpass filters have a relatively narrow bandwidth of approximately 66 Khz and are centered at the intermediate frequency $F_{IF}$. Controlling the voltage controlled oscillator 24 has the effect of tuning the system and keeping the return signals centered in the narrow band Doppler filters thereby providing an increased probability of discrimination against both the 178 Khz pulse repetition frequency lines and the very low Doppler returns from chaff bundles.

Although the invention has been described with reference to a particular embodiment, it will be understood to those skilled in the art that the invention is capable of a variety of alternative embodiments within the spirit and scope of the appended claims.

What is claimed is:

1. A radar fuzing system comprising:
   a master oscillator adapted to generate a radio frequency signal, code modulator means coupled to said master oscillator adapted to modulate said radio frequency signal with a pseudorandom binary code,
   means for transmitting said modulated radio frequency signal from said missile,
   a voltage controlled oscillator adapted to generate an output signal having a frequency determined by an applied control voltage,
   said control voltage being a function of the computed intercept closing velocity between said missile and a target,
   signal conversion means for receiving said radio frequency signal and said output signal from said voltage controlled oscillator to form a local oscillator signal,
   means for receiving a reflected signal from said target,
   means for mixing said local oscillator signal and said reflected signal to provide a code modulated intermediate frequency signal,
   first, second, third and fourth intermediate frequency correlator units each adapted to receive said code modulated intermediate frequency signal, and a different time-delayed replica of said pseudorandom binary code,
   signal combining means adapted to receive output signals from said first and second correlator units,
   first, second and third bandpass filters,
   said first bandpass filter being coupled to said combining means to form a target detection channel,
   said second bandpass filter being coupled to said third correlator unit to form an image detection channel, and
   said third bandpass filter being coupled to said fourth correlator unit to form a clutter detection channel.

2. Apparatus as defined in claim 1 wherein each of said correlator units is a ring modulator device.

3. Apparatus as defined in claim 2 wherein said means for transmitting said modulated radio frequency signal from said missile includes:
- a pair of transmitting antennas mounted at diametrically opposed points on the body of the missile,
- a radio frequency signal amplifier coupled to each of said pair of transmitting antennas,
- and signal divider means adapted to couple a portion of said modulated radio frequency signal to each of said radio frequency signal amplifiers.

4. Apparatus as defined in claim 3 wherein said means for receiving a reflected signal from said target includes,
- a pair of receiving antennas interposed between said transmitting antennas,
- and signal summing means adapted to couple each of said receiving antennas to said mixing means.

5. Apparatus as defined in claim 4 wherein said signal conversion means comprises a single sideband up-converter.

6. Apparatus as defined in claim 5 and further comprising:
- signal processor means coupled to each of said bandpass filters,
- said signal processor providing a firing command in response to predetermined criteria indicative of the detection of valid target responses by said fuzing system.

* * * * *

UNITED STATES PATENT AND TRADEMARK OFFICE
CERTIFICATE OF CORRECTION

PATENT NO. : 4,599,616
DATED : July 8, 1986
INVENTOR(S) : Peter F. Barbella et al It is certified that error appears in the above-identified patent and that said Letters Patent is hereby corrected as shown below:

In column 1, at line 29, after the word "this" insert --type--.

In column 3, at line 23, the equation should read
$$\varepsilon = \Theta_H + \sin^{-1} [V_m/V_t \sin \Theta_H]$$

In column 3, on the last line, the symbol "T4" should read --$T_4$--.

Signed and Sealed this

Fourth Day of November, 1986

[SEAL]

Attest:

Attesting Officer

DONALD J. QUIGG

Commissioner of Patents and Trademarks